United States Patent
Gerrese et al.

(10) Patent No.: US 12,128,921 B2
(45) Date of Patent: Oct. 29, 2024

(54) AUTONOMOUS VEHICLE INTERACTIVE EXPERIENCE PLATFORM

(71) Applicant: GM Cruise Holdings LLC, San Francisco, CA (US)

(72) Inventors: Alexander Willem Gerrese, San Francisco, CA (US); Grace Noh, San Francisco, CA (US); Jennifer Devar McKnew, San Francisco, CA (US); Spencer Lee James, Santa Clara, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 176 days.

(21) Appl. No.: 17/694,544

(22) Filed: Mar. 14, 2022

(65) Prior Publication Data

US 2023/0286532 A1    Sep. 14, 2023

(51) Int. Cl.
*B60W 60/00* (2020.01)
*B60W 40/09* (2012.01)
*B60W 40/105* (2012.01)
*B60W 40/12* (2012.01)

(52) U.S. Cl.
CPC .......... *B60W 60/001* (2020.02); *B60W 40/09* (2013.01); *B60W 40/105* (2013.01); *B60W 40/12* (2013.01); *B60W 2420/408* (2024.01); *B60W 2555/20* (2020.02)

(58) Field of Classification Search
CPC .. B60W 60/001; B60W 40/09; B60W 40/105; B60W 40/12; B60W 2555/20; B60W 2420/408
See application file for complete search history.

(56) References Cited

U.S. PATENT DOCUMENTS

| | | | |
|---|---|---|---|
| 9,266,018 B2 | 2/2016 | Story, Jr. et al. | |
| 11,460,314 B1* | 10/2022 | Ziniti | B60R 11/04 |
| 2016/0089954 A1* | 3/2016 | Rojas Villanueva | B60H 1/00742 701/36 |
| 2017/0308082 A1* | 10/2017 | Ullrich | B60W 60/005 |
| 2019/0197430 A1* | 6/2019 | Arditi | G06N 20/00 |
| 2019/0227553 A1* | 7/2019 | Kentley-Klay | B60L 15/20 |
| 2019/0232974 A1* | 8/2019 | Reiley | G06V 40/161 |
| 2020/0207366 A1* | 7/2020 | Kapuria | B60K 35/28 |
| 2020/0242421 A1* | 7/2020 | Sobhany | G06V 40/70 |

* cited by examiner

*Primary Examiner* — Ramsey Refai

(57) ABSTRACT

Systems and methods for an autonomous vehicle interactive experience platform. An interactive experience platform is provided that utilizes vehicle sensors, as well as in-cabin hardware and software, and fleet management information, to provide a unique and personalized autonomous vehicle interactive experience. The interactive experience platform can use external factors to influence in-experience elements. In some examples, the interactive experience platform can use in-experience events to influence autonomous vehicle behavior.

19 Claims, 7 Drawing Sheets

AUTONOMOUS VEHICLE INTERACTIVE EXPERIENCE PLATFORM

FIELD OF THE DISCLOSURE

The present disclosure relates generally to autonomous vehicles (AVs) and to systems and methods for vehicle entertainment systems.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

Autonomous vehicles can be used to provide rides to passengers for various types of errands and outings. Often, two or more passengers travel together in an autonomous vehicle to a planned event. A passenger can use any available rideshare service for these purposes, with potentially little difference in ride experience. A regular autonomous vehicle ride may feel uneventful and mundane to passengers, resulting in the ride being a utilitarian and transactional experience.

SUMMARY

Systems and methods are provided for a vehicle interactive experience platform. In particular, an interactive experience platform is provided that utilizes vehicle sensors, as well as in-cabin hardware and software, and fleet management information, to provide a unique and personalized vehicle entertainment experience. The interactive experience platform can use external factors to influence in-experience elements. In some examples, the interactive experience platform can use in-experience events to influence autonomous vehicle behavior.

According to one aspect, a method for a vehicle interactive experience platform comprises receiving ride parameters at the interactive experience platform, wherein the ride parameters include a user profile and an estimated ride duration; identifying a subset of interactive experience options from a set of interactive experiences that match selected ride parameters; presenting the subset of interactive experience options; receiving, at the interactive experience platform, an interactive experience selection corresponding to a selected interactive experience; adjusting vehicle cabin settings based on the interactive experience selection; and presenting the selected interactive experience in the vehicle cabin.

In some implementations, the method includes receiving an interactive experience platform request at an onboard computer and adjusting vehicle driving behavior based on the request. In some implementations, adjusting the vehicle driving behavior includes adjusting a vehicle route. In some implementations, adjusting the trip route includes adjusting the trip route to include an interactive experience element. In some implementations, adjusting the vehicle driving behavior includes at least one of adjusting one of vehicle speed, rate of acceleration, and rate of deceleration. In some implementations, the method further comprises receiving vehicle sensor data at the interactive experience platform and adjusting the selected interactive experience based on the sensor data. In some implementations, receiving vehicle sensor data includes receiving at least one of image data, light detection and ranging (LIDAR) data, radio detection and ranging (RADAR) data, weather data, and detected object data.

In some implementations, adjusting vehicle cabin settings includes at least one of tinting a window, adjusting lighting, adjusting a display screen, raising an in-vehicle table, and retracting the in-vehicle table. In some implementations, each of the set of interactive experiences includes a respective approximate interactive experience duration, and wherein identifying the subset of interactive experience options includes identifying interactive experiences in the set of interactive experiences having respective approximate interactive experience durations that are less than the estimated ride duration. In some implementations, the respective approximate interactive experience durations are based in part on the user profile. In some implementations, presenting the subset of interactive experience options includes presenting the subset to one of a user mobile device, an in-vehicle tablet, and an in-vehicle display screen. In some implementations, adjusting vehicle cabin settings based on the interactive experience selection comprises communicating interactive experience selection cabin settings with an onboard computer. In some implementations, presenting the selected interactive experience in the vehicle cabin includes at least one of presenting the selected interactive experience on a display screen, presenting the selected interactive experience audibly, and presenting a physical interactive experience for user set-up.

According to another aspect, a vehicle for providing passenger entertainment comprises: a plurality of sensors inside the vehicle configured to detect a passenger in the vehicle cabin; and a sensor suite including external vehicle sensors to sense a vehicle environment and generate sensor suite sensor data; and an interactive experience platform to: receive sensor suite sensor data, and adjust an interactive experience based on the sensor suite sensor data.

In some implementations, the interactive experience platform is providing the interactive experience inside the vehicle. In some implementations, the interactive experience platform is to receive an interactive experience selection corresponding to the interactive experience and present the selected interactive experience in the vehicle cabin, and further comprising an onboard computer configured to adjust autonomous vehicle cabin settings based on the interactive experience selection. In some implementations, the onboard computer is further to: receive an interactive experience platform request, and adjust vehicle driving behavior based on the request. In some implementations, vehicle driving behavior includes autonomous vehicle driving behavior. In some implementations, vehicle driving behavior includes vehicle speed, rate of acceleration, and rate of deceleration. In some implementations, the onboard computer is further to: receive an interactive experience platform request, and adjust a vehicle route based on the request. In some implementations, the sensor suite sensor data is at least one of image data, LIDAR data, weather data, and detected object data, and wherein the interactive experience platform is to incorporate the sensor suite sensor data into the interactive experience. In some implementations, the sensor suite sensor data is at least one of image data, LIDAR data, weather data, and detected object data, and wherein the interactive experience platform is to incorporate the sensor suite sensor data into the interactive experience.

According to another aspect, system for providing passenger entertainment in a vehicle fleet comprises a central computing system to: receive a ride request including a pick-up location, a drop-off location, and a user profile including an interactive experience profile, determine an approximate ride duration corresponding to the ride request, select a first vehicle from the vehicle fleet to fulfill the ride request, and transmit ride parameters including the ride request, the approximate ride duration, and the user profile to the first vehicle; and the first vehicle having an interactive experience platform to: identify a subset of interactive experience options from a set of interactive experiences that match the ride parameters, receive an interactive experience selection from the subset of interactive experience options corresponding to a selected interactive experience, adjust cabin settings for a vehicle cabin based on the interactive experience selection, and present the selected interactive experience in the vehicle cabin.

In some implementations, the first vehicle includes a sensor suite having external vehicle sensors to sense a vehicle environment and generate sensor suite sensor data, and the first vehicle is further to receive the sensor suite data and adjust the selected interactive experience based on the sensor suite data. In some implementations, the sensor suite sensor data is at least one of image data, LIDAR data, weather data, and detected object data, and wherein the interactive experience platform is to incorporate the sensor suite sensor data into the interactive experience. In some implementations, the first vehicle is to receive an interactive experience platform request and, based on the request, adjust one of vehicle driving behavior and vehicle route. In some implementations, vehicle driving behavior includes vehicle speed, rate of acceleration, and rate of deceleration.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Figure 1:
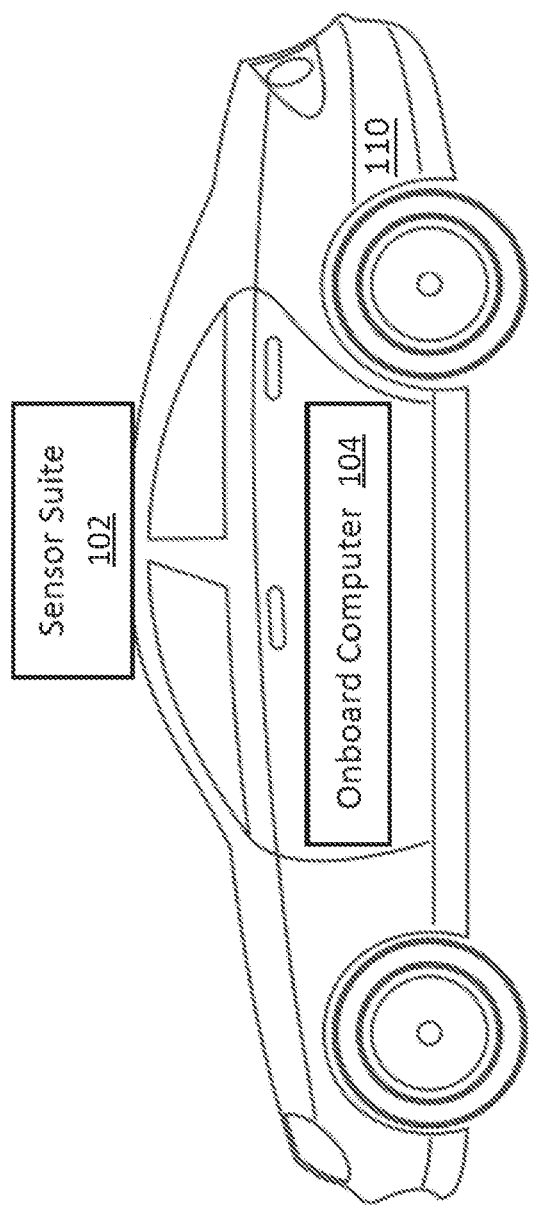
FIG. 1 is a diagram illustrating an autonomous vehicle, according to some embodiments of the disclosure.

Systems and methods are provided herein for an autonomous vehicle interactive experience platform. In particular, the interactive experience platform utilizes vehicle sensors, as well as in-cabin hardware and software, and fleet management information, to provide a unique and personalized autonomous vehicle interactive experience experience. The interactive experience platform can use external factors to influence in-experience elements. In some examples, the interactive experience platform can use in-experience events to influence autonomous vehicle behavior.

Enhanced entertainment options, such as the interactive experience platform provided herein, can distinguish a particular ridehail service from other services. In general, a ridehail experience can feel uneventful and mundane, with riders spending the ride time scrolling mindlessly on phones. During shared or group rides, riders rarely interact with others, and during single rides, riders can feel lonely or bored. Thus, the ridehail experience is generally utilitarian and transactional, with the sole purpose of being transported from a pick-up location to a destination location. Using the interactive experience platform provided herein, the ridehail experience can be transformed to include fun moments that generate lasting impressions and brand loyalty. Additionally, the interactive experience platform can be used to educate riders about autonomous vehicle functioning and technology.

According to some implementations, autonomous vehicle and fleet management technology can be used to provide interactive experience suggestions. In particular, the interactive experience platform provides interactive experience suggestions such that the interactive experience duration (e.g., gameplay time) can be timed with the length of the ride. There are many variables that can affect ride duration, and an incongruent timing of the interactive experience with the ride may result in a poor experience, for example interrupted games or forfeited matches when the autonomous vehicle arrives earlier than expected. The potential for a forfeited match or interrupted experience may cause a rider to decide not to select any interactive experience due to not knowing how to choose an interactive experience that matches the ride length. Thus, the interactive experience platform provided herein is integrated with autonomous vehicle ride information to allow a user to complete an ongoing interactive experience.

Further implementations provided herein connect autonomous vehicle interactive experiences with a user's current reality. Traditionally, games are static and untethered to a user's current reality, which can make the games a fun escape or distraction, but typically prevent the gaming experience from reinforcing user connections to their immediate environment or daily life. Autonomous vehicles, which include many sensors, media touchpoints, and high computing power, can be used to connect the user gaming experience within the autonomous vehicle with the user environment.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

Example Autonomous Vehicle Configured for Interactive Experiences

FIG. 1 is a diagram of an autonomous driving system 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. The autonomous vehicle 110 is configured to provide adaptive privacy settings for shared rides.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment. As described in greater detail below, information about the autonomous vehicle's environment as detected by the sensor suite 102 can be incorporated into one or more interactive experiences (e.g., games, tours) in the interactive experience platform provided herein. In some examples, data from the sensor suite 102 can be used to update a map with information used to develop layers with waypoints identifying various detected items. In some examples, data from the sensor suite 102 can include information regarding crowds and/or lines outside and/or around selected venues. Additionally, sensor suite 102 data can provide localized traffic information. In this way, sensor suite 102 data from many autonomous vehicles can continually provide feedback to the mapping system and the high fidelity map can be updated as more and more information is gathered. In some examples, the interactive experience platform provided herein can use information gathered by other autonomous vehicles in the fleet, for example information in the mapping system, for updating interactive experiences as described in greater detail below.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some examples, the interactive experience platform receives processed sensed sensor suite 102 data from the onboard computer 104. In some examples, the interactive experience platform receives sensor suite 102 data from the sensor suite 102. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface). In some examples, as described in greater detail below, the autonomous vehicle 110 driving behavior is modified based on an ongoing interactive experience on the in-vehicle interactive experience platform. For example the interactive experience platform can provide feedback to the autonomous vehicle 110 to indicate that selected driving behaviors are desirable at selected times. Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, a bicycle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Figure 2A:
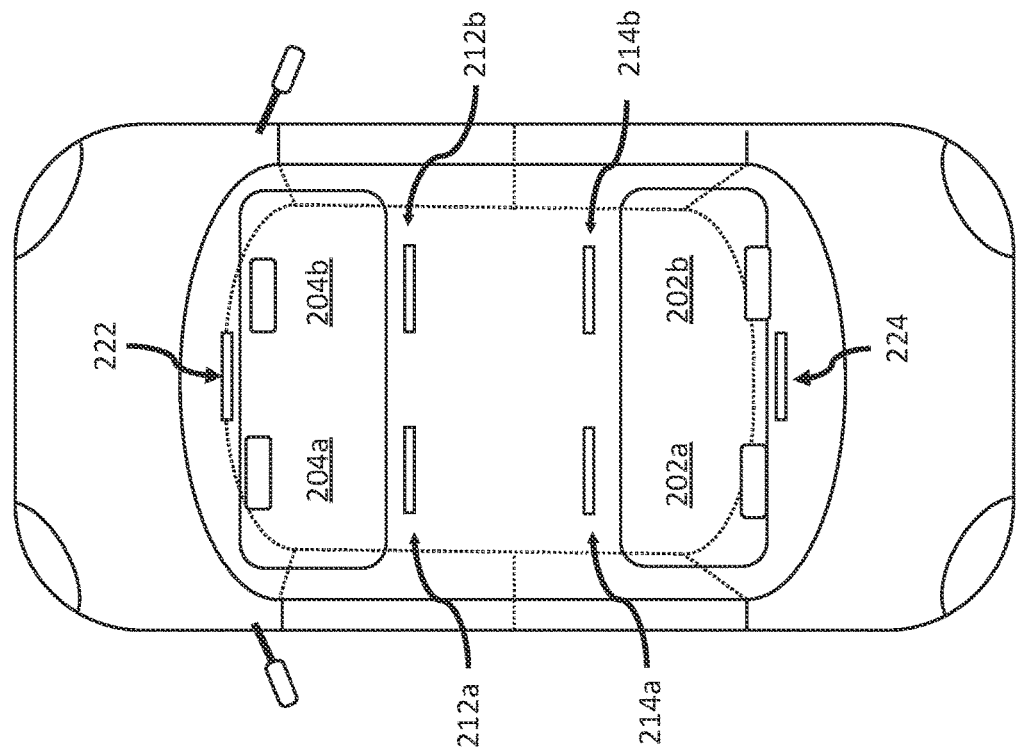
FIGS. 2A and 2B are diagrams showing cutaway top views of an autonomous vehicle, according to some embodiments of the disclosure.

FIG. 2A shows a cutaway top view 200 of the autonomous vehicle 110 with the interior seats facing each other, according to various embodiments of the disclosure. In particular, as shown in FIG. 2A, a first row of seats includes two seats 202a, 202b facing a first direction and a second row of seats includes two seats 204a, 204b facing the opposite direction. The seats 202a, 202b in the first row each face a display screen 212a, 212b, respectively. Similarly, the seats 204a, 204b in the second row each face a display screen 214a, 214b. Each seat 202a, 202b, 204a, 204b is thus associated with a personal display screen 212a, 212b, 214a, 214b, respectively. Passengers in each of the seats 202a, 202b, 204a, 204b can select what is displayed on their respective personal display screens 212a, 212b, 214a, 214b. In some examples, a passenger in the vehicle 110 can play a game with one or more other passengers in the vehicle 110, and the game is displayed on each of the passenger's personal display screen. In various examples, the respective personal display screens 212a, 212b, 214a, 214b are positioned over the opposite seats 202a, 202b, 204a, 204b. In some examples, the personal display screens are in different positions within the vehicle cabin. In various examples, the first row of seats includes more than two seats, and in some examples, the first row of seats includes three seats. Similarly, in various examples, the second row of seats includes more than two seats, and in some examples, the second row of seats includes three seats. In various examples, each seat is associated with a personal display screen, such that if the first row of seats includes three seats, there will be three personal display screens for the first row of seats and if the second row of seats includes three seats, there will be three personal display screens for the second row of seats.

In various implementations, the first row of seats 202a, 202b also faces a first additional display screen 222 and the second row of seats 204a, 204b also faces a second additional display screen 224. The first 222 and second 224 additional display screens are positioned above the opposite row of seats, centered between the seats in the opposite row. In various implementations, the first 222 and second 224 additional display screens display general ride information, such as the current location on a map, the time to the next stop, and the location of the next stop. The first 222 and second 224 additional display screens may also display vehicle information such as the inside and/or outside temperature, the vehicle speed, and the vehicle license plate (or other identifying information). In some examples, the first 222 and second 224 display screens are used by the interactive experience platform to display game information or a part of a game. In some examples, additional display screens can be positioned in other places in the vehicle and can be viewable from some or all passenger seats. For example, a display screen can be positioned along the side of the vehicle cabin.

According to various implementations, the passenger compartment includes a variety of sensors. In some examples, the passenger compartment is equipped with image sensors. The image sensors can include video cameras. Each image sensor is configured to capture images of a portion of the passenger compartment. In one example, each row of seats 202a, 202b and 204a, 204b has two or more image sensors above it and facing the opposite row of seats. In some examples, the passenger compartment sensors include microphones for capturing audio, e.g., voices of passengers in the passenger compartment.

In addition to the display screens 212a, 212b, 214a, 214b, 222, and 224, the passenger compartment can include other output devices. The additional output devices can include speakers as well as additional display screens. In some examples, the display screens include embedded speakers. In other examples, one or more speakers associated with each display screen is positioned closer to the passenger seat associated with the respective display screen. In some examples, various speakers are directed to a selected passenger seat. In some examples, the passenger compartment includes directional speakers that are designed to produce sound at a particular passenger seat, with each passenger seat having one or more associated speakers. In some examples, a passenger has connected earphones or headphones through which audio output is played.

In various examples, the display screens 212a, 212b, 214a, 214b, 222, 224 are equipped to receive user input, e.g., through one or more buttons arranged proximate to each display screen 212a, 212b, 214a, 214b, 222, 224, or through a touch screen. In other implementations, one or more user input devices are located elsewhere in the passenger compartment, e.g., on an armrest, and a passenger can control the display screens 212a, 212b, 214a, 214b, 222, 224 (and/or speakers) using the user input devices. In other examples, a user can provide user input through an interface on a personal user device (e.g., an app running on the user device). In some examples, the display screens 212a, 212b, 214a, 214b, 222, 224 are controlled individually. For example, the display screens 212a, 212b, 214a, 214b, 222, 224 can be controlled separately, so that each passenger has a different view on their respective display screen 212a, 212b, 214a, 214b, 222, 224. Passenger compartment speakers may be located at different points throughout the passenger compartment, and the speakers may be individually or jointly controlled.

In some examples, passenger compartment sensors, such as image sensors and microphones, are in communication with the interactive experience platform. In some examples, to determine whether a seat has a seated passenger, the onboard computer 104 may perform an image detection algorithm on images captured by image sensors. As another example, the passenger compartment includes weight sensors incorporated into the passenger seats that transmit weight measurements to the onboard computer 104, and the onboard computer 104 determines based on the weight measurements whether each seat has a seated passenger. In other embodiments, the onboard computer 104 uses one or more other interior sensors (e.g., lidar, radar, thermal imaging, etc.) or a combination of sensors to identify the locations of passengers seated in the autonomous vehicle 110. In some implementations, the interactive experience platform instructs image sensors directed at seats that have seated passengers to capture video, while other image sensors do not capture video. In some examples, weight and image sensors are used to recommend age-specific interactive experiences to passengers. For instance, based on weight detected in the car seats (and potentially integrating with computer vision from internal image sensors), the approximate age of each of one or more passengers can be estimated and age-appropriate interactive experiences can be recommended. Passenger age approximation can also be used to determine the types of content that are available to view or stream in the vehicle when children are present.

In some examples, passengers can interact with passengers in other autonomous vehicles. In some examples, passengers can play games with passengers in other autonomous vehicles. In-vehicle image sensors can be used to capture live videos of players in other vehicles and display screens can be used to display a live-stream of the other player(s) in real-time. In some examples, internal vehicle image sensors are an interactive experience element and the in-vehicle cameras are used to detect user input to interactive experiences. Similarly, in a multi-player game in a vehicle configured as shown in FIG. 2A with cameras directed at each passenger seat, a gaming experience can be provided in which players who are facing each other sitting at both ends of the vehicle use the cameras as an input mechanism.

In some implementations, one or more of the display screens 212a, 212b, 214a, 214b, 222, 224 and other output devices (e.g., speakers) are in communication with and are controlled by one or both of the interactive experience platform and the onboard computer 104. In one example, the personal display screens 212a, 212b, 214a, 214b and associated speakers are in communication with and are controlled by the interactive experience platform, while the display screens 222, 224 are in communication with and are controlled by the onboard computer 104. In another example, one or more of the display screens 212a, 212b, 214a, 214b, 222, 224 and other output devices (e.g., speakers) are controlled by a separate computer (e.g., a computer integrated one of the display screens or located elsewhere in the autonomous vehicle 110). The separate computer can be associated with the interactive experience platform. In some examples, the computer controlling one or more of the display screens 212a, 212b, 214a, 214b, 222, 224 is in communication with a fleet management system. The computer controlling the display screens 212a, 212b, 214a, 214b, 222, 224 can receive user input from one or more input sources described above, such as a touch screen, microphone, buttons, user interface device, personal user device, or one or more other user input devices. The computer controlling the display screens 212a, 212b, 214a, 214b, 222, 224 may or may not interact with the onboard computer 150.

Figure 2B:
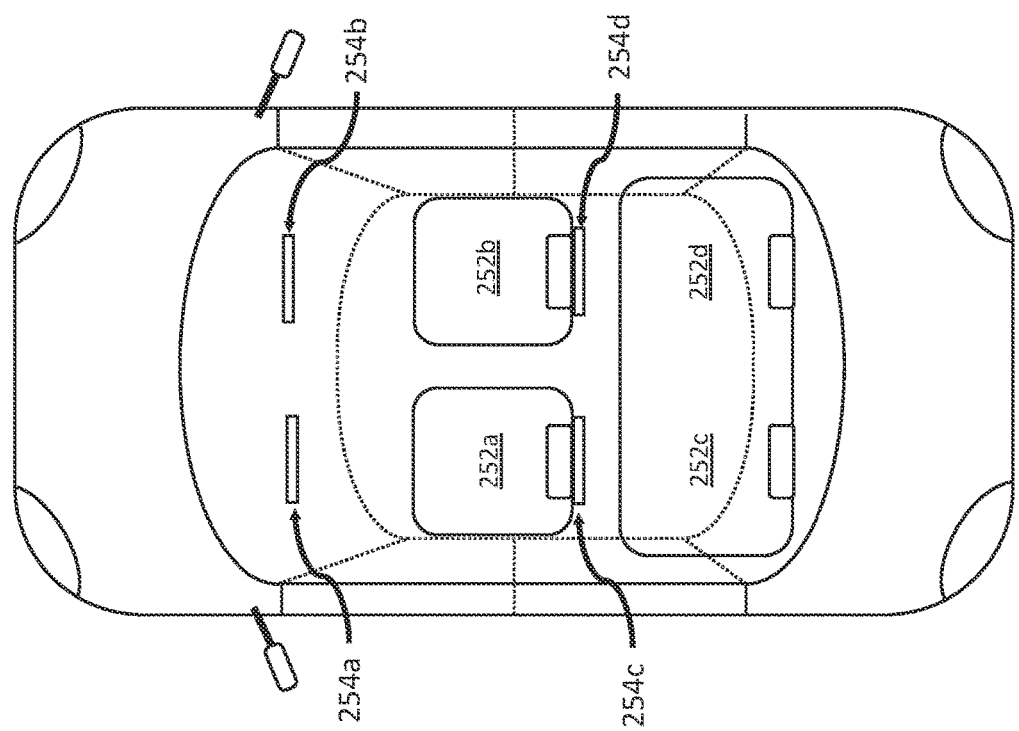

FIG. 2B shows a cutaway top view of the autonomous vehicle 110 with a different seating arrangement, according to various embodiments of the disclosure. As shown in FIG. 2B, there are four passenger seats 252a, 252b, 252c, 252d in the autonomous vehicle 110, arranged all facing forwards. In front of each passenger seat 252a, 252b, 252c, 252d is a screen 254a, 254b, 254c, 254d. In various examples, the screens 254a, 254b, 254c, 254d can be used for entertainment, virtual meetings, video conferences, to display trip information, or for any other visual display, similar to the screens 212a, 212b, 214a, 214b, 222, 224 described above. In particular, a passenger sitting in the first seat 252a can view the first screen 254a, a passenger sitting in the second seat 252b can view the second screen 254b, a passenger sitting in the third seat 252c can view the third screen 254c, and a passenger sitting in the fourth seat 252d can view the fourth screen 254d.

In some examples, each screen 254a-254d is equipped with an image sensor such as a video camera, which can be used to video the respective passenger for an interactive experience or for use in a virtual meeting. Similarly, in some examples, each screen 254a-254d is equipped with a microphone, which can be used to pick-up the respective passenger's voice for an interactive experience (e.g., a game) or a virtual meeting.

In various examples, the autonomous vehicle 110 can determine which seat each respective passenger is sitting in. That is, the autonomous vehicle 110 can determine that passenger A is sitting in the first seat 252a, passenger B is sitting in the second seat 252b, passenger C is sitting in the third seat 252c, and passenger D is sitting in the fourth seat 252d. In some examples, wireless technology such as NFC (Near Field Communication), Bluetooth, or inaudible sounds, can be used within the autonomous vehicle cabin to determine a passenger's mobile device location and infer passenger seat location. In some examples, an inaudible sound for mobile device location is a high frequency sound with a particular signature that is inaudible to humans but detectable by microphones. In various examples, the passenger mobile device can emit the inaudible sound and microphones in the autonomous vehicle detect the sound and determine device location. In some examples, multiple sensors are used to detect a signal and determine device location.

In some examples, computer vision can be used within the autonomous vehicle cabin to determine a passenger's seat location. In some examples, passengers are assigned a seat in the autonomous vehicle before entering the vehicle and informed of their designated seat via the rideshare application. The passenger can then confirm their seat location after entering the vehicle. In some examples, sensors determine that a passenger is sitting in a seat based on a seatbelt being buckled and/or using a seat weight sensor.

In alternate configurations, the passenger compartment has rows of seats in different configurations (e.g., two rows facing the same direction), more rows of seats, fewer rows of seats, one or more individual seats (e.g., bucket seats), or some combination of seats (e.g., one bench seat and two bucket seats). The arrangement of display screens and the image sensors may be different from the arrangement shown in FIGS. 2A and 2B based on the arrangement of the seats. In particular, the passenger compartment includes one or more display screens that are visible to each of the passenger seats, and image sensors that are positioned to capture a view of each passenger seat. In some embodiments, a single image sensor can capture a view of multiple passenger seats.

Example Method for Autonomous Vehicle Interactive Experiences

Figure 3:
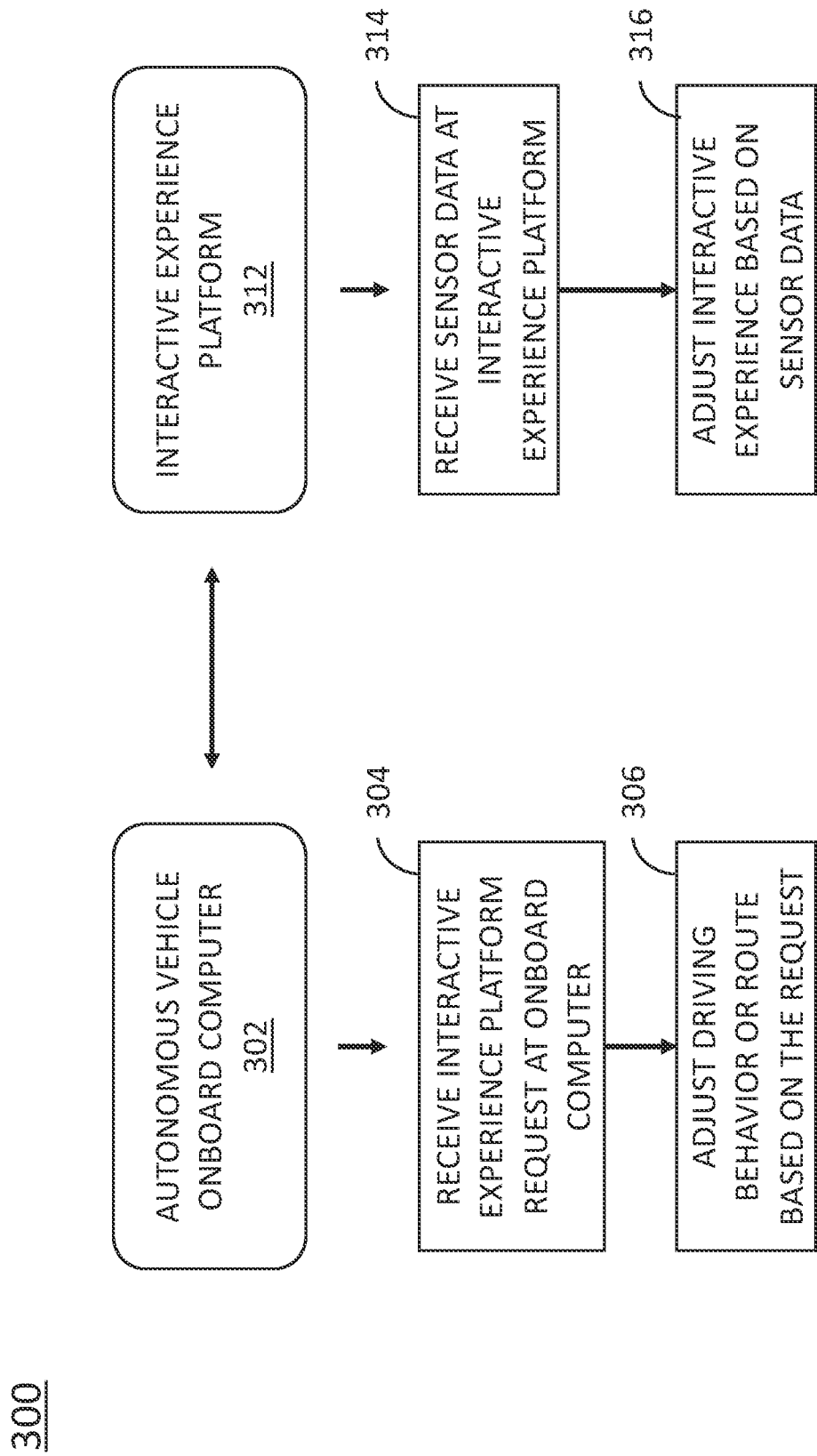
FIG. 3 is a diagram illustrating interactions between an autonomous vehicle interactive experience platform and the autonomous vehicle, according to some embodiments of the disclosure.

FIG. 3 is a diagram illustrating interactions between an autonomous vehicle interactive experience platform 312 and the autonomous vehicle onboard computer 302, according to some embodiments of the disclosure. In particular, the interactive experience platform and autonomous vehicle are designed such that in-experience events are related to the real world in which the autonomous vehicle is operating. There is a two-way relationship between the interactive experience and the real world around the autonomous vehicle, such that in-experience events can affect autonomous vehicle behavior and environmental factors outside the autonomous vehicle (as well as autonomous vehicle behavior itself) can affect in-experience elements and events. As shown in FIG. 3, the autonomous vehicle behavior is interrelated with interactive experience platform in-experience events.

According to some examples, autonomous vehicle 302 behavior is dynamically modified based on selected in-experience events 312. In particular, the autonomous vehicle onboard computer receives an interactive experience platform request, at 304. In some examples, the request is a route change request. A route change request can include a request for a detour to a specific landmark, to pass a specific on-road or roadside object, or to circle a block to extend a ride. In some examples, the request is a driving behavior change request. For a route change request, at 306, the autonomous vehicle onboard computer evaluates the request and the current route and identifies a route change that complies with the route change request. In some examples, the autonomous vehicle onboard computer communicates with a central computer and/or a routing coordinator to identify a route change. A driving behavior change request can include a request to accelerate more quickly, to accelerate more sluggishly, to decelerate, to drive more slowly, or any other driving behavior request. The autonomous vehicle onboard computer evaluates the current driving behavior and determines whether it is advisable to adjust autonomous vehicle behavior. If the autonomous vehicle onboard computer determines there are no contraindications to adjusting the autonomous vehicle driving behavior, at step 306, the autonomous vehicle onboard computer can change the driving behavior to comply with the interactive experience platform request.

According to some examples, the interactive experience platform in-experience events are dynamically modified based on autonomous vehicle sensor data and/or driving behavior. In particular, at 314, autonomous vehicle sensor data is received at the interactive experience platform. The autonomous vehicle sensor data can include data regarding current weather conditions, nearby vehicles, pedestrians, animals, or other objects or landmarks, road conditions and construction, and any other sensor data. At 316, the interactive experience platform adjusts the interactive experience based on sensor data. Examples of interactive experiences that may be updated based on sensor data include games, such as I Spy, frogger, labyrinth, Pokemon Go, a murder mystery dinner game, autonomous vehicle jeopardy, or any game that includes a procedurally-generated environment. Other sensor-based interactive experiences can include games asking how many of a selected item a passenger can spot (e.g., "how many red things do you see?", "how many letter A's do you see?", "how many dogs do you see?"), which the passenger can play with/against the autonomous vehicle.

In one example, the interactive experience is a scavenger hunt, and the autonomous vehicle route and/or destination is updated based on in-experience events such as an item that passengers are directed to find. The autonomous vehicle can use its map and routing data to create an interactive scavenger hunt experience along the route. In one example, the autonomous vehicle can provide clues about notable landmarks along the route and ask passengers to identify the landmarks as they pass. Passengers who are riding similar routes may be given overlapping sets of clues, and thus the experience can be gamified by showing a leaderboard or percentile rank among others who responded to similar clues. As passengers get closer to a landmark, there is an on-screen visualization that they are getting "hotter", and as they pass by, they are getting "colder." In another example, the scavenger hunt experience may incorporate sensor data such as a LIDAR point-cloud of an object observed near the car that the passenger is asked to identify and presented with a few text based options or a few photos of objects in the surrounding environment to select from. In another example, the autonomous vehicle presents participants with clues about locations, and the passengers are able to select a destination and may have the option to dynamically re-route the autonomous vehicle while driving to a different location. In some examples, participating in the scavenger hunt game awards riders with ride credits that can be used as credit towards future rides.

In another example, the interactive experience is a "choose your own adventure"-type game, and the autonomous vehicle route and/or destination is updated based on the adventure selected. In various examples, the passenger's final destination (or the passenger's list of stops on a longer itinerary) is selected based on the passenger's gameplay choices.

In some examples, the autonomous vehicle's driving style is temporarily modified based on in-experience events. For instance, an autonomous vehicle's driving style may be affected by in-experience power-ups to become slightly more aggressive, or to accelerate somewhat faster than is typical, when certain power-ups are collected. Similarly, in some instances, the autonomous vehicle's driving style may be affected by in-experience power-ups to become slightly more sluggish (e.g., slower acceleration, taking side roads, pausing longer at stops) when other power-ups are collected.

In some examples, a passenger is rewarded for good gameplay or in-experience bonuses with sponsored intermediate stops. For instance, a reward may be a free ice cream on the way to the destination. In some examples, a passenger is penalized for bad gameplay with a more circuitous route. In another example, in a multi-player game, entertaining stakes can be added to the game such as which player pays for the ride, such that the loser must pay, and payment can be automated through the ridehail application. In some examples, the autonomous vehicle takes a more circuitous route to allow a passenger to complete an interactive experience (e.g., finish a game). In further examples, other in-experience events are tied to vehicle routes in such a way that the autonomous vehicle dynamically reroutes in response to in-experience events.

According to some implementations, the autonomous vehicle sensors, high fidelity maps, local weather data, and other datasets can be leveraged to impact in-experience environments and gameplay. An autonomous vehicle driving through a city can dynamically generate realistic in-experience elements and full three-dimensional environments from its map data of the city to populate in various interactive experiences. The in-experience environment can also react to changes in local weather conditions. For example, the in-experience environment can be rainy when it's raining outside and sunny when it's sunny outside. Additionally, in some implementations, vehicles in a first autonomous fleet in a first city can collect data about the first city, and vehicles in a second autonomous fleet in a second city can use the environment of the first city for the in-experience environment. Thus, for example, a passenger in an autonomous vehicle in San Francisco can choose an in-experience environment of Paris. Similarly, for example, a passenger in an autonomous vehicle in Mobile, Alabama can choose an in-experience environment of Tokyo. This can allow the passenger to have a more exciting, foreign experience in the autonomous vehicle.

In some implementations, the interactive experience platform provides interactive experiences that rely on the autonomous vehicle's sensors and perception algorithms. These interactive experiences are unique to vehicles equipped with the sensors described herein and the accompanying perception algorithms used by the autonomous vehicle in which they are installed. These are interactive experiences that require detection and recognition of objects that are inside or outside the vehicle at a particular time. The autonomous vehicle partakes in the interactive experience by choosing objects that it has recognized and facilitating interactive experiences with passengers (e.g., by voice, through in-vehicle tablets, and/or via in-vehicle display screens). In some examples, interactive experiences that can use the autonomous vehicle's sensors and perception algorithms include road trip games such as "I Spy" (e.g., the autonomous vehicle selects an item the player (or players) can see either inside or outside the vehicle, and the player tries to guess the item), the License Plate Game (e.g., the player identifies license plates matching selected features, such as the state or certain letters or numbers, and the autonomous vehicle helps identify license plates), and Twenty Questions. In some examples, interactive experiences can include a timer that can be based on autonomous vehicle route data. For instance, in I Spy, the autonomous vehicle can estimate the amount of time during which the selected "spied" item will be visible from the vehicle and set the timer accordingly. In various examples, the autonomous vehicle can play any role in these multi-player games, such that a single passenger can play these games with the autonomous vehicle. Similarly, multiple passengers can play games with the autonomous vehicle interactive experience platform.

In some implementations, the user's pick-up location, drop-off location, and or general location can be leveraged to suggest interactive experiences such as asking local trivia questions (autonomous vehicle jeopardy), and/or "I Spy" or "Pokemon Go" type games that focus on local landmarks.

In some implementations, the interactive experience platform modifies output to minimize motion sickness. For example, timing of various interactive experience elements can be adjusted to minimize the likelihood of motion sickness. Additionally, the interactive experience platform can communicate with the autonomous vehicle onboard computer to take into account planned driving behaviors and/or known road conditions that cause motion sickness, and to adjust the interactive experience to minimize the likelihood of motion sickness.

Example Method for Autonomous Vehicle Interactive Experience Selection

Figure 4:
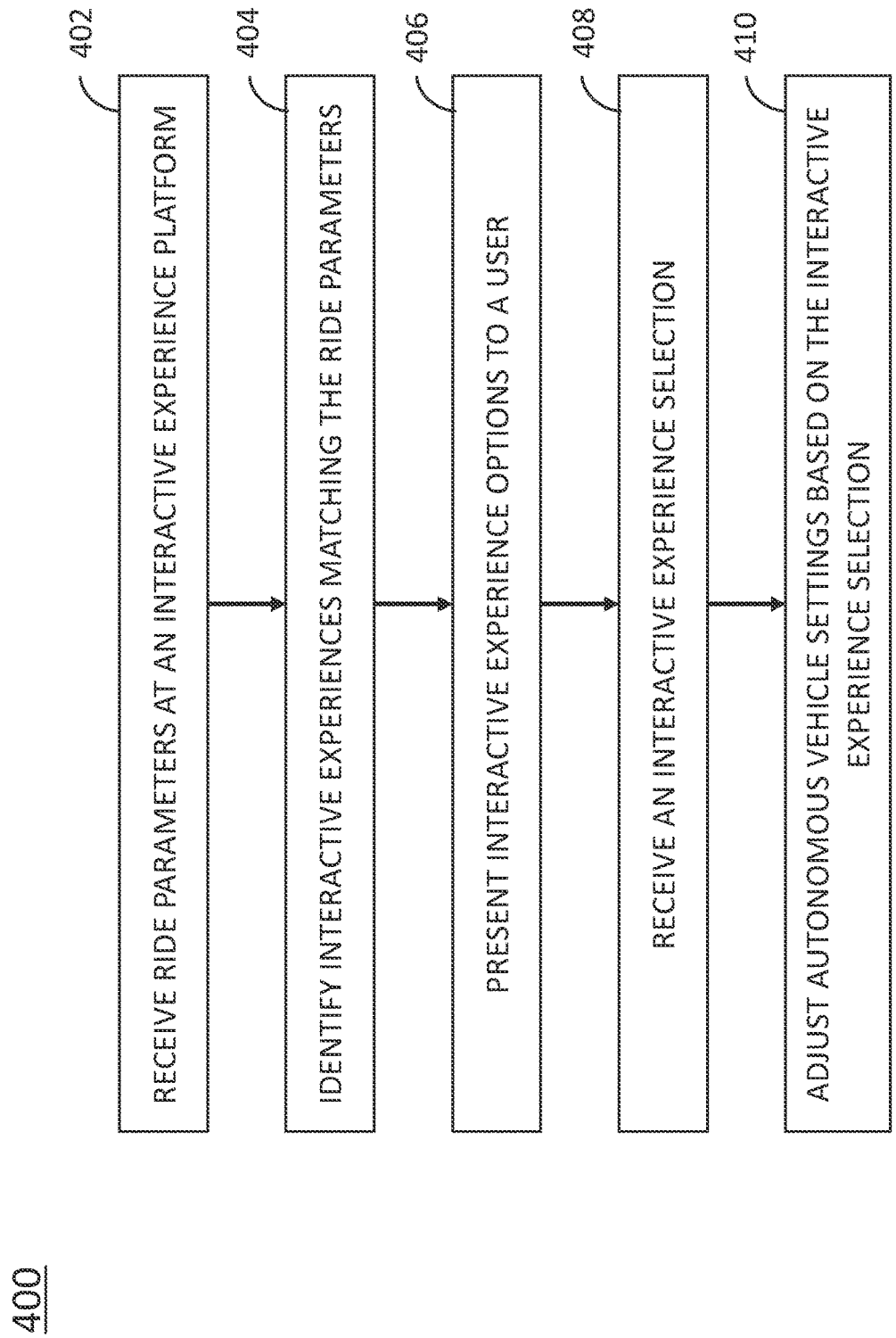
FIG. 4 is a diagram illustrating a method for determining interactive experience selections in an autonomous vehicle interactive experience platform, according to some embodiments of the disclosure.

FIG. 4 is a diagram illustrating a method 400 for determining interactive experience selections in an autonomous vehicle interactive experience platform, according to some embodiments of the disclosure. At step 402, a user's ride parameters are received at the interactive experience platform. The ride parameters can include the pick-up location, the destination location, any intermediate stops, the expected duration of the ride, the number of passengers, and any user preference information.

At step 404, the interactive experience platform identifies interactive experiences matching the ride parameters. For example, the interactive experience platform can identify interactive experiences that can be completed within the estimated time for the ride. Due to autonomous vehicle and fleet data on routing, live traffic update, and previous and current ridehail trips, the estimated length of a selected ride can be calculated with high precision. For a long trip, options may include a story-based interactive experience, or a board game such as Monopoly. For a 15-minute trip, options may include fast-paced interactive experiences such as blitz chess, Angry Birds, or Tetris. In other examples, user preferences can be used to further identify appropriate interactive experiences. For example, some users may want to exclude violent games or interactive experiences with explicit content.

During rides for which the trip duration estimate was incorrect (e.g., due to unforeseen traffic) or the timing of an interactive experience is different from expected (e.g., a passenger is having a monster run and taking longer than usual/expected), the autonomous vehicle ride can be lengthened to accommodate the interactive experience and provide passenger with additional uninterrupted time to play. For example, the autonomous vehicle can be dynamically rerouted or the autonomous vehicle can circle the block. In some examples, an option can be presented to the user for a preferred buffer time at the end of the ride as a modifier to interactive experience choices. In some examples, a user can save an interactive experience in a current state at the end of a ride and resume the experience when the user returns for a subsequent ride in a vehicle in the fleet. For instance, a passenger can save a game at any selected point and, when the passenger begins a subsequent ride, the passenger can have the option of resuming the game at the saved time point.

At step 406, the interactive experience options identified at step 404 are presented to the user. In some examples, user preferences are used in determining the order in which interactive experience options are presented. User preferences can be manually entered (e.g., a preference for solitary interactive experiences, a preference for road trip games, a preference for board games, a preference for video games, and/or specific preferences such as I spy, Tetris, or Monopoly). User preferences can also be based on past user selections, with interactive experiences frequently selected in the past being placed at or near the top of the list. In various implementations, the interactive experience options can be presented to the user on the user mobile device, the interactive experience options can be presented on an in-vehicle tablet, and the interactive experience options can be presented on an in-vehicle display screen.

At step 408, the interactive experience selection is received from the user. In some examples, when interactive experience options are presented to the user on the user mobile device, the interactive experience options are presented before the ride begins, and the user can select an interactive experience before the autonomous vehicle reaches the pick-up location and/or before entering the autonomous vehicle. When a user pre-selects an interactive experience prior to entering the autonomous vehicle, the pick-up experience can be adjusted to include thematic and/or cinematic elements that tie into the selected interactive experience. In other examples, the interactive experience is selected after the user has entered the autonomous vehicle. Note that in some examples, the user may choose not to select an interactive experience and the selection that is received is for no interactive experience.

At step 410, the autonomous vehicle settings are adjusted based on the interactive experience selection. For example, the vehicle can have a retractable table inside the vehicle cabin and a storage container for board games. When a physical game is selected, the autonomous vehicle can cause the table to extend from it's retracted positions so that the passenger(s) can use it. Similarly, when a physical game is selected, the autonomous vehicle can cause the storage container for the board games to unlock and/or open. In another example, for interactive experiences in which privacy matters (e.g., card games such as Go Fish), the autonomous vehicle can tint the windows to avoid glare and reflections that might allow other players to see an opponent's cards. Additionally, in-vehicle tablets and/or display screens can switch to game-oriented interfaces such as scoresheets, virtual dice, game timers, etc. In another example, vehicle cabin lighting can be adjusted based on the interactive experience selection. For video games, interior cabin lighting may be dimmed, while for board games, lighting may be brightened.

In some examples, interactive experiences are used to encourage other passenger behaviors. For instance, the interactive experience may not begin until the passenger has fastened their seatbelt, or the interactive experience may automatically pause if the passenger seatbelt is unfastened.

In some implementations, the interactive experience platform can be used to encourage social interactions and group gaming. With a fleet of autonomous vehicles transporting passengers at any given moment, interactive experiences between autonomous vehicles can be offered. Autonomous vehicle-to-autonomous vehicle interactive experiences can include matching passengers on separate trips to play a game. This can include matching passengers on separate trips in the same city as well as potentially matching passengers across the world. In one example, an interactive experience platform matching algorithm pairs passengers who have about the same amount of trip time. In another example, the interactive experience platform can allow games to hand off from the car tablets and/or display screens to the passengers' mobile devices to continue playing after the autonomous vehicle ride is completed. An autonomous vehicle fleet gaming leaderboard structure can provide incentives for various interactive experiences, including giving credits to be used for future rides and/or deliveries.

In some implementations, passengers can become labelers by gamifying the labeling process. Labelers label objects in the vehicle's environment. Gamifying the labeling process can include a Captcha-like strategy. For example, the autonomous vehicle can present certain unique and fun objects that it has recently seen on the road and ask the user to confirm/deny what the object is. For instance, the interactive experience can display an image and ask "What is this object? A bike, a person with a giraffe hat on, a tree covered in tinsel, or something else?" or "Highlight all of the pigeons in this scene." Users can also label objects by trying to identify as many objects as possible in a period of time (e.g., a minute), starting with low-fidelity point clouds that only reveal the general shape of an object and progressively adding fidelity as time passes until the user correctly identifies the object. In some examples, having passengers label objects can strengthen autonomous vehicle machine learning models and training data.

According to further implementations, the interactive experience platform can be used to improve the autonomous vehicle fleet simulation pipeline and educate users about autonomous vehicle technology. For instance, a build-your-own simulation experience can provide passengers the opportunity to learn how the autonomous vehicle would react in various situations by allowing passengers to craft their own environments and scenarios. For example, a simulation can be created in which five trash cans are diagonally placed in the middle of the road, a biker is cutting off the autonomous vehicle, it is dark outside, and the autonomous vehicle is currently driving at 50 mph (miles per hour). Then the passenger can see how the autonomous vehicle would react in this situation.

Example of Autonomous Vehicle Fleet

Figure 5:
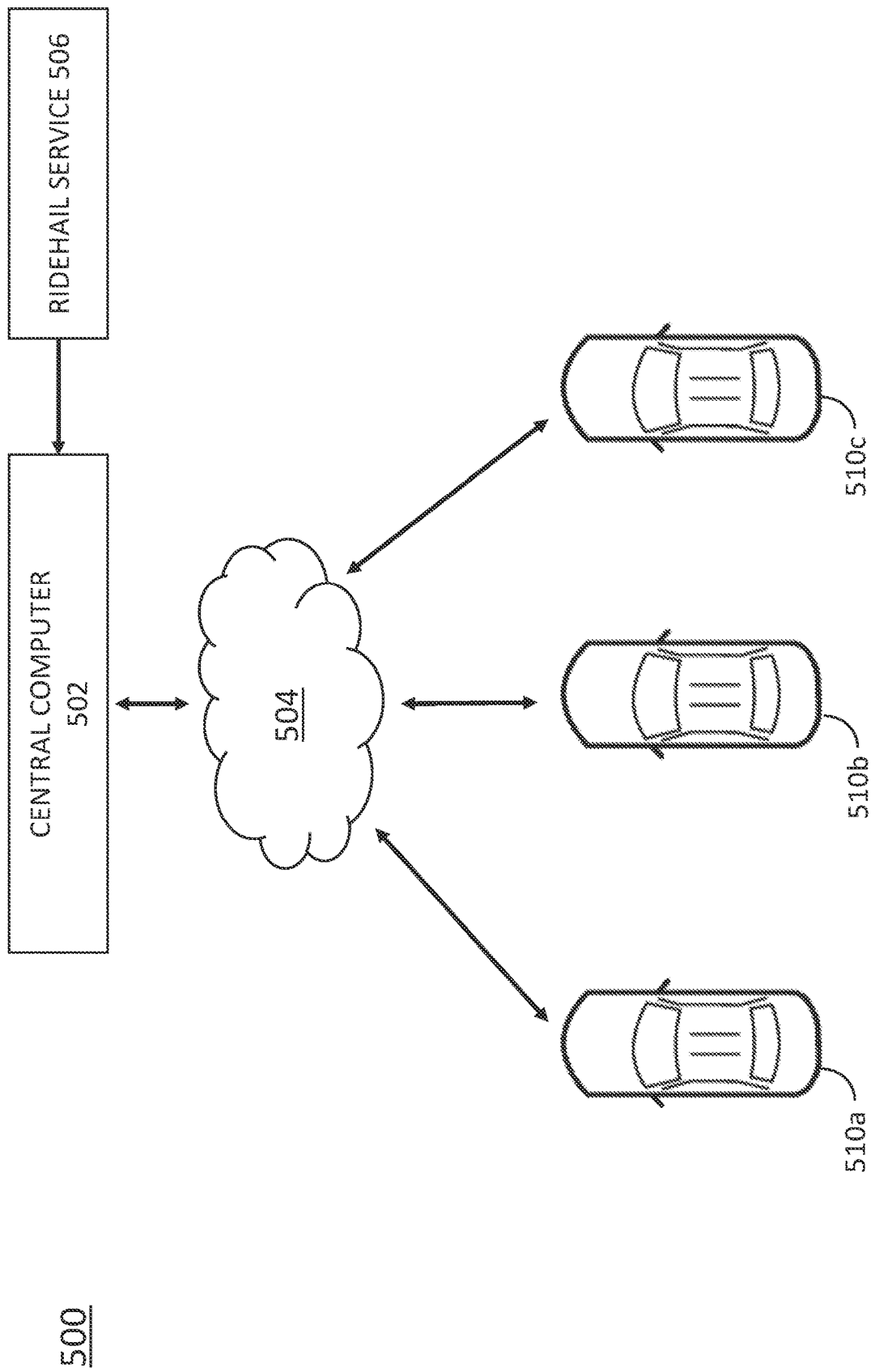
FIG. 5 is a diagram illustrating a fleet of autonomous vehicles in communication with a central computer, according to some embodiments of the disclosure.

FIG. 5 is a diagram 500 illustrating a fleet of autonomous vehicles 510a, 510b, 510c in communication with a central computer 502, according to some embodiments of the disclosure. The vehicles 510a-510c communicate wirelessly with a cloud 504 and a central computer 502. The central computer 502 includes a routing coordinator and a database of information from the vehicles 510a-510c in the fleet. Autonomous vehicle fleet routing refers to the routing of multiple vehicles in a fleet. The central computer also acts as a centralized ride management system and communicates with ridehail users via a ridehail service 506. Via the ridehail service 506, the central computer receives ride requests from various user ridehail applications. In some implementations, the ride requests include in-vehicle interactive experience preferences. In some examples, after receiving a ride request, the ridehail service 506 provides an interface for the user to select an interactive experience. In some implementations, the autonomous vehicles 510a-510c communicate directly with each other. In some implementations, interactive experience platforms on the autonomous vehicles 510a-510c communicate directly with each other.

When a ride request is entered at a ridehail service 506, the ridehail service 506 sends the request to the central computer 502. If the ridehail request is for a future date, the central computer 502 stores the information for future routing determinations. In some examples, on the day of the ride request, during a selected period of time before the ride begins, the vehicle to fulfill the request is selected and route for the vehicle is generated by the routing coordinator. In other examples, the vehicle to fulfill the request is selected and the route for the vehicle is generated by the onboard computer on the autonomous vehicle. In various examples, information pertaining to the ride, such as passenger interactive experience selection, is transmitted to the selected vehicle 510a-510c. With shared rides, the route for the vehicle can depend on other passenger pick-up and drop-off locations. Each of the autonomous vehicles 510a, 510b, 510c in the fleet are equipped to provide an interactive experience platform as described above with respect to FIGS. 2A, 2B, 3, and 4. The vehicles 510a, 510b, 510c communicate with the central computer 502 via the cloud 504.

As described above, each vehicle 510a-510c in the fleet of vehicles communicates with a routing coordinator. Thus, information gathered by various autonomous vehicles 510a-510c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more traveling preferences and/or routing goals. In some examples, a traveling preference includes a request for a longer ride to accommodate planned in-vehicle activities, such as interactive experiences. In some examples, the routing coordinator uses collected position data corresponding to emergency events to generate a best route for an autonomous vehicle to avoid a potential emergency situation and associated unknowns. In some examples, a vehicle route is updated to lengthen the route in order to accommodate an interactive experience and allow a passenger to finish an interactive experience already started.

According to various implementations, a set of parameters can be established that determine which metrics are considered (and to what extent) in determining routes or route modifications. For example, expected congestion or traffic based on a known event can be considered. In another example, the interactive experience platform can influence routing if an interactive experience includes a reason to pass by a selected landmark, such as a scavenger hunt type game. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, safety of the route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, laws, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridehailing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, ridehail revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals takes priority. Routing goals and routing goal priorities may be set by any suitable source (e.g., an autonomous vehicle routing platform, an autonomous vehicle passenger).

The routing coordinator uses maps to select an autonomous vehicle from the fleet to fulfill a ride request. In some implementations, the routing coordinator sends the selected autonomous vehicle the ride request details, including pick-up location and destination location, and an onboard computer on the selected autonomous vehicle generates a route and navigates to the destination. In some implementations, the routing coordinator in the central computer 502 generates a route for each selected autonomous vehicle 510*a*-510*c*, and the routing coordinator determines a route for the autonomous vehicle 510*a*-510*c* to travel from the autonomous vehicle's current location to a first destination.

Example of a Computing System for Ride Requests

Figure 6:
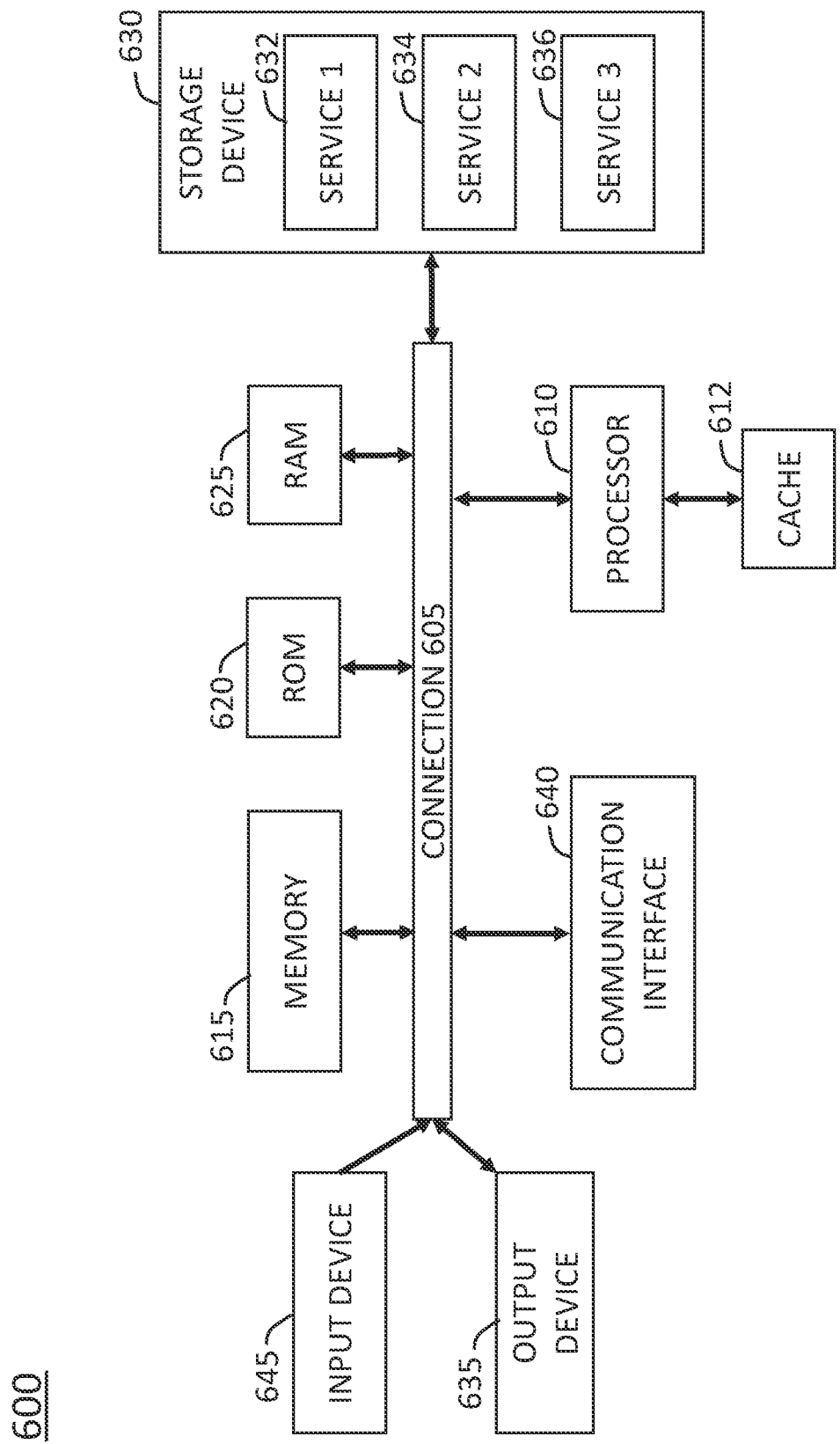
FIG. 6 shows an example embodiment of a system for implementing certain aspects of the present technology.

FIG. 6 shows an example embodiment of a computing system 600 for implementing certain aspects of the present technology. In various examples, the computing system 600 can be any computing device making up the onboard computer 104, the central computer 502, or any other computing system described herein. The computing system 600 can include any component of a computing system described herein which the components of the system are in communication with each other using connection 605. The connection 605 can be a physical connection via a bus, or a direct connection into processor 610, such as in a chipset architecture. The connection 605 can also be a virtual connection, networked connection, or logical connection.

In some implementations, the computing system 600 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 600 includes at least one processing unit (CPU or processor) 610 and a connection 605 that couples various system components including system memory 615, such as read-only memory (ROM) 620 and random access memory (RAM) 625 to processor 610. The computing system 600 can include a cache of high-speed memory 612 connected directly with, in close proximity to, or integrated as part of the processor 610.

The processor 610 can include any general-purpose processor and a hardware service or software service, such as services 632, 634, and 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction, the computing system 600 includes an input device 645, which can represent any number of input mechanisms, such as a microphone for speech, a touch-sensitive screen for gesture or graphical input, keyboard, mouse, motion input, speech, etc. The computing system 600 can also include an output device 635, which can be one or more of a number of output mechanisms known to those of skill in the art. In some instances, multimodal systems can enable a user to provide multiple types of input/output to communicate with the computing system 600. The computing system 600 can include a communications interface 640, which can generally govern and manage the user input and system output. There is no restriction on operating on any particular hardware arrangement, and therefore the basic features here may easily be substituted for improved hardware or firmware arrangements as they are developed.

A storage device 630 can be a non-volatile memory device and can be a hard disk or other types of computer-readable media which can store data that are accessible by a computer, such as magnetic cassettes, flash memory cards, solid state memory devices, digital versatile disks, cartridges, RAMs, ROMs, and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as a processor 610, a connection 605, an output device 635, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an Internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Select Examples

Example 1 provides a method for a vehicle interactive experience platform, comprising receiving ride parameters at the interactive experience platform, wherein the ride parameters include a user profile and an estimated ride duration; identifying a subset of interactive experience options from a set of interactive experiences that match selected ride parameters; presenting the subset of interactive experience options; receiving, at the interactive experience platform, an interactive experience selection corresponding to a selected interactive experience; adjusting vehicle cabin settings based on the interactive experience selection; and presenting the selected interactive experience in the vehicle cabin.

Example 2 provides a method, system, or vehicle according to one or more of the preceding and/or following examples, further comprising receiving an interactive experience platform request at an onboard computer and adjusting vehicle driving behavior based on the request.

Example 3 provides a method, system, or vehicle according to one or more of the preceding and/or following examples, wherein adjusting the vehicle driving behavior includes adjusting a vehicle route.

Example 4 provides a method, system, or vehicle according to one or more of the preceding and/or following examples, wherein adjusting trip route includes adjusting the trip route to include an interactive experience element.

Example 5 provides a method, system, or vehicle according to one or more of the preceding and/or following examples, wherein adjusting the vehicle driving behavior includes at least one of adjusting one of vehicle speed, rate of acceleration, and rate of deceleration.

Example 6 provides a method, system, or vehicle according to one or more of the preceding and/or following examples, further comprising receiving vehicle sensor data at the interactive experience platform and adjusting the selected interactive experience based on the sensor data.

Example 7 provides a method, system, or vehicle according to one or more of the preceding and/or following examples, wherein receiving vehicle sensor data includes receiving at least one of image data, LIDAR data, weather data, and detected object data.

Example 8 provides a method, system, or vehicle according to one or more of the preceding and/or following examples, wherein adjusting vehicle cabin settings includes at least one of tinting a window, adjusting lighting, adjusting a display screen, raising an in-vehicle table, and retracting the in-vehicle table.

Example 9 provides a method, system, or vehicle according to one or more of the preceding and/or following examples, wherein each of the set of interactive experiences includes a respective approximate interactive experience duration, and wherein identifying the subset of interactive experience options includes identifying interactive experiences in the set of interactive experiences having respective approximate interactive experience durations that are less than the estimated ride duration.

Example 10 provides a method, system, or vehicle according to one or more of the preceding and/or following examples, wherein the respective approximate interactive experience durations are based in part on the user profile.

Example 11 provides a method, system, or vehicle according to one or more of the preceding and/or following examples, wherein presenting the subset of interactive experience options includes presenting the subset to one of a user mobile device, an in-vehicle tablet, and an in-vehicle display screen.

Example 12 provides a method, system, or vehicle according to one or more of the preceding and/or following examples, wherein adjusting vehicle cabin settings based on the interactive experience selection comprises communicating interactive experience selection cabin settings with an onboard computer.

Example 13 provides a method according to one or more of the preceding and/or following examples, wherein presenting the selected interactive experience in the vehicle cabin includes at least one of presenting the selected interactive experience on a display screen, presented the selected interactive experience audibly, and presenting a physical interactive experience for user set-up.

Example 14 provides a vehicle for providing passenger entertainment, comprising: a plurality of sensors inside the vehicle configured to detect a passenger in the vehicle cabin; and a sensor suite including external vehicle sensors to sense an vehicle environment and generate sensor suite sensor data; and an interactive experience platform to: receive sensor suite sensor data, and adjust an interactive experience based on the sensor suite sensor data.

Example 15 provides a vehicle, system, or method according to one or more of the preceding and/or following examples, wherein the interactive experience platform is providing the interactive experience inside the vehicle.

Example 16 provides a vehicle, system, or method according to one or more of the preceding and/or following examples wherein the interactive experience platform is to receive an interactive experience selection corresponding to the interactive experience and present the selected interactive experience in the vehicle cabin, and further comprising an onboard computer configured to adjust vehicle cabin settings based on the interactive experience selection.

Example 17 provides a vehicle, system, or method according to one or more of the preceding and/or following examples, wherein the onboard computer is further to: receive an interactive experience platform request, and adjust vehicle driving behavior based on the request.

Example 18 provides a vehicle, system, or method according to one or more of the preceding and/or following examples, wherein vehicle driving behavior includes vehicle speed, rate of acceleration, and rate of deceleration.

Example 19 provides a vehicle, system, or method according to one or more of the preceding and/or following examples, wherein the onboard computer is further to: receive an interactive experience platform request, and adjust a vehicle route based on the request.

Example 20 provides a vehicle, system, or method according to one or more of the preceding and/or following examples, wherein the sensor suite sensor data is at least one of image data, LIDAR data, RADAR data, weather data, and detected object data, and wherein the interactive experience platform is to incorporate the sensor suite sensor data into the interactive experience.

Example 21 provides a system for providing passenger entertainment in a vehicle fleet, comprising a central computing system to: receive a ride request including a pick-up location, a drop-off location, and a user profile including a interactive experience profile, determine an approximate ride duration corresponding to the ride request, select a first vehicle from the vehicle fleet to fulfill the ride request, and transmit ride parameters including the ride request, the approximate ride duration, and the user profile to the first vehicle; and the first vehicle having an interactive experience platform to: identify a subset of interactive experience options from a set of interactive experiences that match the ride parameters, receive an interactive experience selection from the subset of interactive experience options corresponding to a selected interactive experience, adjust cabin settings for a vehicle cabin based on the interactive experience selection, and present the selected interactive experience in the vehicle cabin.

Example 22 provides a system, method, or vehicle according to one or more of the preceding and/or following examples, wherein the first vehicle includes a sensor suite having external vehicle sensors to sense an vehicle environment and generate sensor suite sensor data, and the first vehicle is further to receive the sensor suite data and adjust the selected interactive experience based on the sensor suite data.

Example 23 provides a system, method, or vehicle according to one or more of the preceding and/or following examples, wherein the sensor suite sensor data is at least one of image data, LIDAR data, RADAR data, weather data, and detected object data, and wherein the interactive experience platform is to incorporate the sensor suite sensor data into the interactive experience.

Example 24 provides a system, method, or vehicle according to one or more of the preceding and/or following examples, wherein the first vehicle is to receive an interactive experience platform request and, based on the request, adjust one of vehicle driving behavior and vehicle route.

Example 25 provides a system, method, or vehicle according to one or more of the preceding and/or following examples, wherein vehicle driving behavior includes vehicle speed, rate of acceleration, and rate of deceleration.

Example 26 provides an vehicle fleet comprising: a first vehicle having a first sensor suite and a first interactive experience platform, wherein the first interactive experience platform is to: receive first sensor suite data; generate first interactive experience environment data, transmit the first interactive experience environment data to a central computing system, receive an interactive experience selection, and adjust an in-vehicle environment based on the interactive experience selection; and the central computing system to: receive first interactive experience environment data from the first vehicle, and transmit the first interactive experience environment data to a second vehicle.

Example 27 comprises a fleet of vehicles including: a first autonomous vehicle having a first sensor suite and a first interactive experience platform, wherein the first interactive experience platform receives first sensor suite data and generates first gaming environment data, and a second autonomous vehicle having a second sensor suite and a second interactive experience platform, wherein the second interactive experience platform receives second sensor suite data and generates second gaming environment data; and a central computing system to: receive first gaming environment data from the first interactive experience platform and second gaming environment data from the second interactive experience platform; and transmit the first gaming environment data to the second interactive experience platform.

Example 28 comprises a system for providing passenger entertainment in a vehicle fleet, comprising: a fleet of autonomous vehicle including a first autonomous vehicle having a first interactive experience platform and a second autonomous vehicle having a second interactive experience platform; and a central computing system to: receive a first multi-player interactive experience request from the first interactive experience platform and a second multi-player interactive experience request from the second interactive experience platform; match the first multi-player interactive experience request with the second multi-player interactive experience request.

Example 29 provides a system, method, or vehicle according to one or more of the preceding and/or following examples, wherein the interactive experience is an interactive game.

Example 30 provides a system, method, or vehicle according to one or more of the preceding and/or following examples, wherein the vehicle is an autonomous vehicle.

Variations and Implementations

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, or one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for an autonomous vehicle interactive experience platform, comprising:
    receiving ride parameters at the interactive experience platform, wherein the ride parameters include a user profile and an estimated ride duration;
    identifying a subset of interactive experience options from a set of interactive experiences that match selected ride parameters;
    presenting the subset of interactive experience options;
    receiving an interactive experience selection from the subset of interactive experience options corresponding to a selected interactive experience;
    adjusting cabin settings for a vehicle cabin based on the interactive experience selection;
    presenting the selected interactive experience in the vehicle cabin;
    receiving an interactive experience platform request at an onboard computer; and
    adjusting autonomous vehicle driving behavior based on the interactive experience platform request.

2. The method of claim 1, further comprising: prior to adjusting the autonomous vehicle driving behavior based on the interactive experience platform request, determining that there are no contraindications to adjusting the autonomous vehicle driving behavior.

3. The method of claim 1, wherein adjusting the vehicle driving behavior includes adjusting an autonomous vehicle route, the interactive experience platform request being based on a gameplay choice.

4. The method of claim 1, wherein adjusting the vehicle driving behavior includes at least one of adjusting one of vehicle speed, rate of acceleration, and rate of deceleration.

5. The method of claim 1, further comprising receiving vehicle sensor data at the interactive experience platform and adjusting the selected interactive experience based on the vehicle sensor data.

6. The method of claim 5, wherein receiving vehicle sensor data includes receiving at least one of image data, LIDAR data, RADAR data, weather data, and detected object data.

7. The method of claim 1, wherein adjusting vehicle cabin settings includes at least one of tinting a window, adjusting lighting, adjusting a display screen, raising an in-vehicle table, and retracting the in-vehicle table.

8. The method of claim 1, wherein each of the set of interactive experiences includes a respective approximate interactive experience duration, and wherein identifying the subset of interactive experience options includes identifying interactive experiences in the set of interactive experiences having respective approximate interactive experience durations that are less than the estimated ride duration.

9. The method of claim 8, wherein the respective approximate interactive experience durations are based in part on the user profile.

10. A method for a vehicle interactive experience platform, comprising:
receiving ride parameters at the interactive experience platform, wherein the ride parameters include a user profile and an estimated ride duration;
identifying a subset of interactive experience options from a set of interactive experiences that match selected ride parameters;
presenting the subset of interactive experience options;
receiving an interactive experience selection from the subset of interactive experience options corresponding to a selected interactive experience;
adjusting cabin settings for a vehicle cabin based on the interactive experience selection;
presenting the selected interactive experience in the vehicle cabin, the selected interactive experience having a gaming environment;
receiving vehicle sensor data from a sensor suite having external vehicle sensors to sense a vehicle environment; and
adjusting the gaming environment based on the vehicle sensor data.

11. The method of claim 10, wherein the game environment includes a procedurally-generated environment, the procedurally-generated environment updated based on the vehicle sensor data.

12. The method of claim 10, wherein the game environment includes a three-dimensional environment and the vehicle sensor data includes autonomous vehicle mapping data, the three-dimensional environment updated based on the autonomous vehicle mapping data.

13. The method of claim 12, further comprising:
receiving an in-experience environment selection; and
updating the three-dimensional environment with map data based on the in-experience environment selection.

14. The method of claim 10, further comprising:
detecting one or more objects in the vehicle environment based on the vehicle sensor data;
updating the game environment based on the detected object.

15. A method for an autonomous vehicle interactive experience platform, comprising:
receiving ride parameters at the interactive experience platform, wherein the ride parameters include a user profile and an estimated ride duration;
identifying a subset of interactive experience options from a set of interactive experiences that match selected ride parameters;
presenting the subset of interactive experience options;
receiving an interactive experience selection from the subset of interactive experience options corresponding to a selected interactive experience;
adjusting cabin settings for a vehicle cabin based on the interactive experience selection;
presenting the selected interactive experience in the vehicle cabin, the selected interactive experience having a gaming environment;
receiving vehicle sensor data from a sensor suite having external vehicle sensors to sense a vehicle environment;
adjusting the gaming environment based on the vehicle sensor data;
receiving an interactive experience platform request at an onboard computer; and
adjusting autonomous vehicle driving behavior based on the interactive experience platform request.

16. The method of claim 15, wherein adjusting the autonomous vehicle driving behavior includes adjusting an autonomous vehicle route.

17. The method of claim 16, wherein adjusting the autonomous vehicle route includes adding an intermediate stop based on a gameplay choice.

18. The method of claim 16, wherein adjusting the autonomous vehicle route includes altering a destination based on a gameplay choice.

19. The method of claim 15, further comprising:
determining a timing of the selected interactive experience is different from expected; and
dynamically adjust an autonomous vehicle route to lengthen the expected ride duration.

* * * * *